United States Patent [19]

Gold

[11] Patent Number: 5,470,422
[45] Date of Patent: Nov. 28, 1995

[54] AUTO INSERT MOLDING AND METHOD OF INSTALLATION

[76] Inventor: Peter Gold, 389 Peninsula Blvd., Hempstead, N.Y. 11550

[21] Appl. No.: 334,574

[22] Filed: Nov. 7, 1994

[51] Int. Cl.⁶ .............................. B60J 1/00; B60J 10/02
[52] U.S. Cl. .............................. 156/108; 296/93
[58] Field of Search .................... 296/201, 93, 84.1; 156/108

[56] References Cited

U.S. PATENT DOCUMENTS 4,850,640  7/1989  Gold ....................................... 296/201

FOREIGN PATENT DOCUMENTS 0124423  1/1986  Japan ........................................ 296/93
0254015  10/1990  Japan ....................................... 296/201

Primary Examiner—Michael W. Ball
Assistant Examiner—Sam Chuan Yao

[57] ABSTRACT

The use of "limp", i.e. 70-durometer Ethylene Propylene Di-Monomer ("EPDM"), construction material for an auto windshield insert molding which is installed in the gap between the windshield and the oversized windshield opening by a method contemplating manual adjustment of the molding crown to any height variations while the stem of the molding is being engaged by urethane that is curing, such that previously required hold-down adhesive strips are obviated as were required when using flexible construction material that resisted manual adjustments of the crown. By eliminating hold-down adhesive strips there is no subsequent removal thereof required which inadvertently caused paint removal and other surface marring.

1 Claim, 1 Drawing Sheet

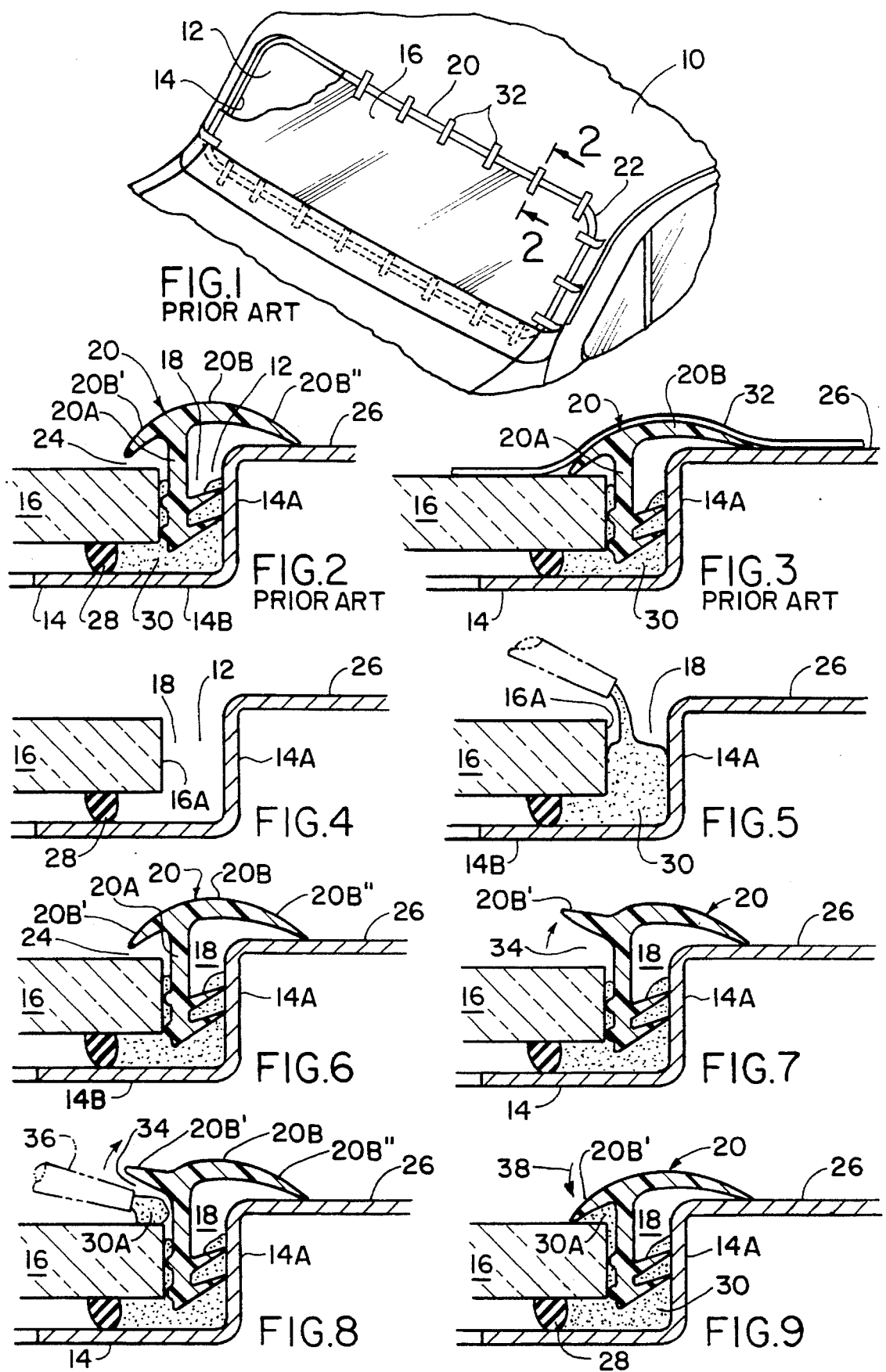

AUTO INSERT MOLDING AND METHOD OF INSTALLATION

The present invention relates generally to an auto insert molding as used as a weather barrier seal about the peripheral edge of the auto windshield, and more particularly to a molding of selected "limp" construction material which facilitates the installation thereof despite manufacturing tolerance deviations between the windshield and the wall bounding the windshield opening.

BACKGROUND OF THE INVENTION

1. Field of the Invention

Auto insert moldings are, of course, already well known and documented in the prior patented literature, as exemplified by U.S. Pat. No. 4,648,222 issued to Toshimi Miyata et al. on Mar. 10, 1987 and U.S. Pat. No. 4,890,431 issued to Kenji Katayama on Jan. 2, 1990 (FIGS. 2 and 4 embodiment). These patents have been selected because, pertinent hereto, they illustrate an inadvertent installation condition in which the gap into which the molding is inserted is bounded on one side by a windshield that is below the height of the auto panel on the opposite side, so that not only does the molding have to seal the gap therebetween but also account for the height difference between the structures bounding the gap.

The crown of the molding of the '222 patent is thus provided with an inclined orientation in the direction of the height difference so that contact is established between the crown portions overhanging the lower windshield and the higher auto panel. This solution requires a specific height difference and only nominal deviation therefrom.

2. Description of the Prior Art

In the insert molding embodiment of the '431 patent, the crown extensions overhanging the windshield and body panel are extruded with a height difference and similarly is only effective for a specific height difference.

SUMMARY OF THE INVENTION

Broadly, it is an object of the present invention to provide an auto insert molding advantageously using its selected construction material to overcome the foregoing and other shortcomings of the prior art.

The construction material selected for extrusion of the within molding which, in practice, exhibits a "limp" or nominal resistance to shape change from its extruded shape, and which heretofore has not been known for use as an auto reveal molding, is Ethylene Propylene Di-Monomer (hereafter "EPDM") elastomeric material of 70 durometer, commercially available from Colonial Rubber Works, Inc. of Dyersburg, Tenn., and like sources of compound polymers. EPDM elastomeric materials at significantly higher durometer characteristics, e.g. 90A durometer, are described along with extrusion instructions in U.S. Pat. No. 5,311,711 issued to Julio Desir, Sr. for "J-Type Window Lace Assemblies" on May 17, 1994, but are too inflexible for practicing the within inventive molding-installation method, as will now be better understood from the proceeding description thereof.

BRIEF DESCRIPTION OF THE DRAWING

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of an insert windshield installed either according to prior art practice or according to the within inventive method;

FIGS. 2 and 3, designated prior art, are respectively a cross sectional view of a preliminary installation condition as taken along line 2—2 of FIG. 1, and FIG. 3 a similar cross sectional view but of the final step of the prior art installation method; and FIGS. 4–9 are cross sectional views similar to FIGS. 2 and 3, but of the within inventive method and in which the sequence of the method steps corresponds to the number sequence of these figures.

DESCRIPTION OF THE PREFERRED EMBODIMENT

As well understood, an auto 10 has a front opening 12 bounded by a flange 14 formed by a vertical wall 14A and lateral leg 14B, on which leg a glass windshield 16 appropriately sized and shaped to fit within the opening 12 is supported on the leg 14B. The opening 12 is intentionally oversized with respect to the windshield 16 resulting in a gap 18 therebetween which is closed using a weather-barrier sealing extruded elastomeric molding 20 which, because it is inserted in the gap 18, is aptly known as an insert molding, and is to be distinguished from a gripper molding that is first positioned about the periphery of the windshield 16 prior to placement of the windshield and molding 16, 20 into the opening 12.

According to prior art practice, and as shown in FIGS. 2 and 3 in conjunction with FIG. 1, the molding 20 in the shape as extruded includes a depending stem 20A and a gap-covering crown 20B and, without any known exception, is of an elastomeric or rubber construction material that is characterized by a resiliency that resists any shape change or modification. That is, while the elastomeric construction material of a prior art molding 20 will bend around a corner, as at 22, any attempted modification of the transverse relation of the crown 20B to the depending stem 20A, by way of example, is resisted by an urgency induced in the elastomeric which restores the original shape or transverse relation. Thus, a lifted crown 20B will not so remain unless it is held in this modified shape or condition.

As shown in FIGS. 2 and 3, a preliminary condition in the installation of insert molding 20 that has to be contended with is an unintended, but nevertheless occurring, height difference 24 between the top of the windshield 16 and the auto panel 26, despite even minimizing efforts using beneath the windshield a urethane-confining dam 28 of a size selected to minimize the height difference 24. Thus, after the deposit of a urethane mass 30 in the gap 18, the molding 20 is inserted into the urethane 30 and due to the height difference 24 the crown overhang 20B' over the windshield 16 fails to establish contact with the windshield 16 that will prevent moisture or the like from seeping into the gap 18 and possibly past the seal provided by the molding 20. Since, at this initial stage, the urethane 30 has not yet cured or hardened, because this curing typically takes 24 hours, urging the molding 20 in descending movement further into the gap 18 is futile since the urgency of the elastomeric construction material, as previously explained, causes the crown overhang 20B" over auto panel 26 to urge the molding 20 in an opposite ascending movement.

As shown in FIG. 3, the final prior art installation method thus contemplates the use of adhesive strips 32 at spaced locations, as shown in FIG. 1, about the periphery of the windshield 16 in spanning relation between the windshield 16 and body panel 26 and, of course, over the molding crown 20B. The need for the strips 32 is a significant shortcoming in that the customer of an aftermarket windshield installer is required to leave with the unsightly strips 32 in place as shown in FIG. 1 and, on the next day after the urethane cures, must attend to the removal of the strips 32. It is not uncommon for the strip removal to inadvertently remove paint from the body panel 26 or otherwise mar the paint finish of the auto 10.

Reference should now be made to FIGS. 4–9 which illustrate in sequence the steps of the within inventive method which obviates the need for hold-down adhesive strips 32.

FIG. 4 illustrates the preliminary step of seating of the auto windshield 16 with an adhered depending dam 28 and of a selected size and shape in a conforming sized and shaped windshield opening 12 bounded by the flange wall 14A.

FIG. 5 demonstrates the next step of depositing a urethane mass 30 into the gap 18 between the peripheral edge 16A of windshield 16 and flange wall 14A.

FIG. 6, like FIG. 2, illustrates the inserting of the molding 20 into the gap 18 which projects the depending stem 20A into the, as yet uncured, urethane 30 and positions the crown overhang 20B' in a clearance position, as at 24, above the windshield 16.

As a departure from prior art practice, the construction material of the molding 20 is, according to the within inventive method, extruded of elastomeric material having little or no "memory", by which is meant it has only a nominal resistance to shape change from its shape or configuration as extruded and as shown in FIG. 6.

FIG. 7 thus shows as the next step possible only according to the within inventive method, namely that of lifting the crown overhang 20B' from its FIG. 6 position to that shown which increases its clearance from the windshield 16 and provides an access opening 34 to the underside of the crown overhang 20B'. And because there is no resistance to this shape change in the elastomeric construction material of the molding 20, the crown overhang 20B' remains lifted and maintains the access opening 34 available for use.

FIG. 8 illustrates the use of the access opening 34 to insert another urethane mass 30A beneath the crown overhang 20B' using a caulking gun-type appliance 36 or the like.

As the last method step as depicted in FIG. 9, the installer manually urges the crown overhang 20B' in closing movement 38 against the windshield 16 and thus into the urethane mass 30A, the crown overhang 20B', again because it does not resist this shape change, remaining in its closed position against the windshield 16 until the urethane masses 30 and 30B completely cure. It is to be noted that the viscous or "tacky" nature of the urethane 30A, even in its uncured state, provides an adhesive attachment between the windshield 16 and crown overhang 20B that is effective to hold the latter in its closed position against the windshield 16 until the urethane fully cures.

Thus, a 70-durometer EPDM elastomeric molding 20 is installed without hold-down adhesive strips 32 according to the method of FIGS. 4–9 as above described.

While the auto insert molding for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. An installation method for an insert auto windshield molding of a type having a stem in depending relation from a crown in the installation of which said molding is inserted in a gap between a windshield seated in an auto windshield opening and a wall bounding said windshield opening so as to establish an attachment between said depending stem and in said gap a previous deposit of urethane having a curing time interval, and plural hold-down adhesive strips being strategically located circumferentially about said windshield in covering relation over said molding to prevent the inadvertent lifting thereof during said urethane curing time interval, a method of obviating using said hold-down adhesive strips during the insert installation of said molding comprising the steps of extruding from 70-durometer EPDM elastomeric construction material characterized by nominal resistance to shape change a molding in a configuration having a stem depending from a crown, seating an auto windshield of a selected size and shape in a conforming sized and shaped windshield opening, depositing urethane in a gap between a peripheral edge of said windshield and a wall bounding said auto windshield opening, inserting said molding into said gap so as to project said depending stem into said urethane and positioning said crown in covering relation over said gap, lifting said crown in overlying relation to said windshield from said gap-covering position into a clearance position, inserting beneath said lifted crown remaining in said clearance position due to said nominal resistance to shape change of said 70-durometer EPDM elastomeric construction material another deposit of urethane along said peripheral edge of said windshield, and urging said lifted crown in closing movement against said windshield, whereby said moved crown remains closed upon said windshield until said urethane cures to complete said molding installation without use of hold-down adhesive strips which heretofore inadvertently caused surface marring upon removal.

\* \* \* \* \*